May 16, 1933. W. G. WILSON 1,909,480
METHOD OF PRODUCING WEAR RINGS
Filed June 18, 1931  2 Sheets-Sheet 1

INVENTOR.
Wylie G. Wilson
BY Ramsey and Kent
ATTORNEYS.

May 16, 1933.  W. G. WILSON  1,909,480
METHOD OF PRODUCING WEAR RINGS
Filed June 18, 1931   2 Sheets-Sheet 2

INVENTOR.
Wylie G. Wilson
BY Ramsey and Kent
ATTORNEYS.

Patented May 16, 1933

1,909,480

UNITED STATES PATENT OFFICE

WYLIE G. WILSON, OF ELIZABETH, NEW JERSEY, ASSIGNOR TO EVERLASTING VALVE COMPANY, OF JERSEY CITY, NEW JERSEY, A CORPORATION OF NEW JERSEY

METHOD OF PRODUCING WEAR RINGS

Application filed June 18, 1931. Serial No. 545,196.

This invention relates to a method for producing a composite structure in which a compressible annular member which forms a wear ring is held in highly compressed condition between inner and outer gripping rings.

A particular object of the invention is to produce a wear ring of great hardness and durability that is eminently suitable for use as a valve sealing ring, as a wear member in a thrust bearing, or for other uses where great resistance to rubbing wear is requisite.

In carrying out these objects, the wear member is formed of laminated asbestos or other suitable material and is held in highly compressed condition between inner and outer gripping rings.

The parts are preferably assembled so that in the final construction the outer ring is pressing inwardly against the compressible member and the inner ring is pressing outwardly, thereby holding the wear member in highly compressed condition between these two support or gripping rings.

Further objects and advantages of the invention will become apparent as the description proceeds, and while a preferred form has been disclosed for purposes of illustration, it should be understood that various changes may be made within the spirit and scope of the invention as set forth and claimed without departing from the spirit of the invention.

Figure 1:
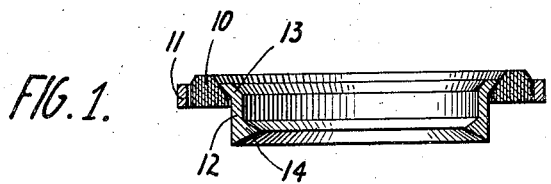
Figure 1 is a cross section through a ring assembly, showing the inner and outer gripping rings with the wear ring between them after initial assembly.

Referring first to the preferred form of the invention, the reference numeral 10 indicates the wear ring which is preferably formed of laminated asbestos with a cylindrical exterior surface, the laminations of the asbestos being parallel to the cylindrical surface, as disclosed in my Patent No. 1,645,785. If preferred for a particular set of conditions, the wear ring may be formed of moulded asbestos, or any other suitable slightly elastic material. 11 and 12 are inner and outer gripping rings respectively, which are continuous rings of any material such as steel, suitable for the purpose. The outer gripping ring has its inner surface slightly roughened in any suitable manner, as by rough machining in order to better grip the asbestos. The inner gripping ring 12 is slightly longer than the outer gripping ring and may have its upper end coned outwardly, as indicated at 13, and its lower end formed with an internal rib 14.

Figure 2:
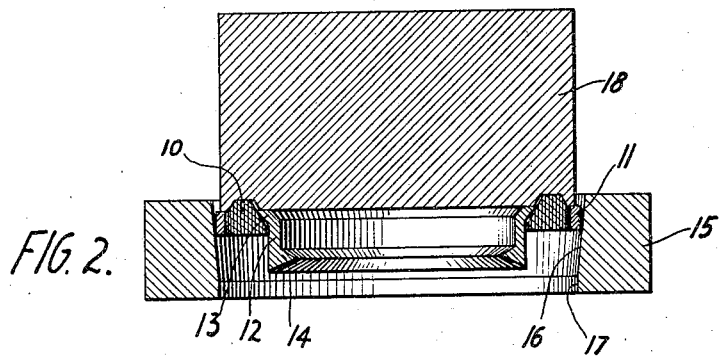
Figure 2 is similar to Figure 1, but shows in addition the punch and die by which the outer ring is contracted.

After the rings have been assembled, they are placed in the die illustrated in Figure 2, which has a conical bore 16 ending in a cylindrical bore 17. Suitable means is provided to hold the rings in assembled position and the assembly is pushed from the position of Figure 2 to the position of Figure 3 by the plunger 18. During this movement the tapered bore contracts the outer gripping ring inwardly, permanently deforming it and causing it to strongly press inwardly against the wear ring, contracting the outer diameter of the wear ring.

Figure 3:
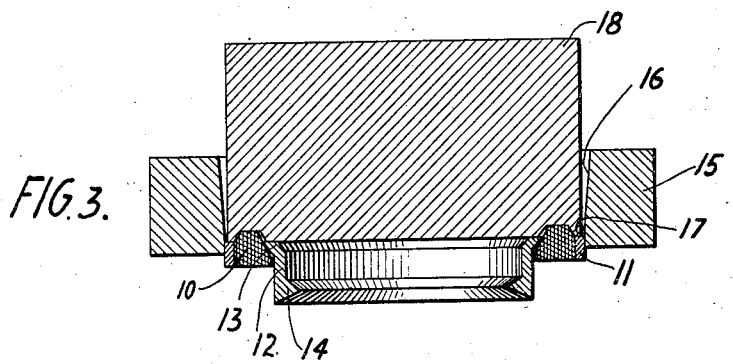
Figure 3 is a view similar to Figure 2, at the end of the contracting step.

If from the position of Figure 3 the ring assembly were pushed entirely through the die and permitted to fall free, the outer ring would expand somewhat due to its natural resiliency, but it would still be appreciably smaller than its original size and it would continue to press inwardly on the wear ring.

However, instead of permitting the outer ring to expand freely, it is pushed directly into a suitable recess formed in the supporting member 19, the recess 20 being circular and only slightly larger than the cylindrical bore 17 of die 15. An additional undercut recess 21 is formed inwardly from the recess 20. After the ring assembly has reached the position of Figure 3, the ring assembly is inserted in the recess support member to the initial position of Figure 4. An additional downward movement of plunger 18 now pushes the ring assembly free from the bore 17, and causes the outer ring to seat in the recess 20, as shown in Figure 5.

Figure 4:
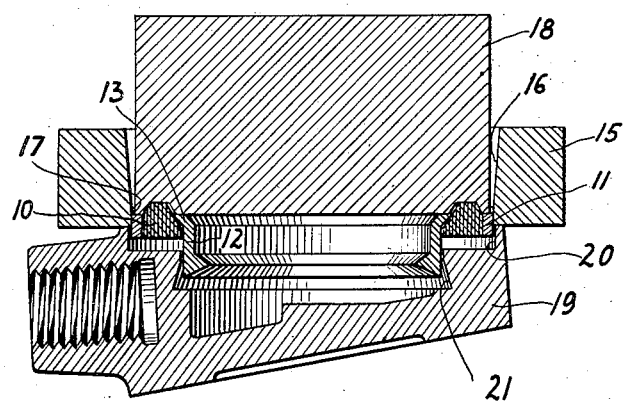
Figure 4 is a cross section showing the parts being inserted in a support member.
Figure 5:
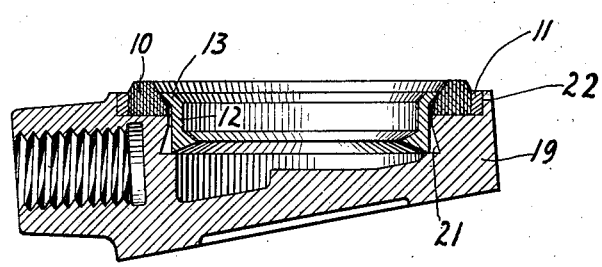
Figure 5 is a cross section through the support member after the ring assembly has been initially inserted therein.

As the outer gripping ring leaves the cylindrical bore 17, in moving from the position of Figure 4 to that of Figure 5, it will expand slightly as explained above, and in addition, when the supporting member 19 is a valve head, as illustrated, having a relatively thin wall 22 surrounding the recess 20, there may also be a slight outward yielding of the wall 22. However, the amount of taper in the bore 16 and the relative fit of the parts are so designed that even after the outward expansion of the outer gripping ring and the wall 22, the outer gripping ring will permanently continue to press outwardly against the wall 22, thereby permanently gripping the support body.

Figure 6:
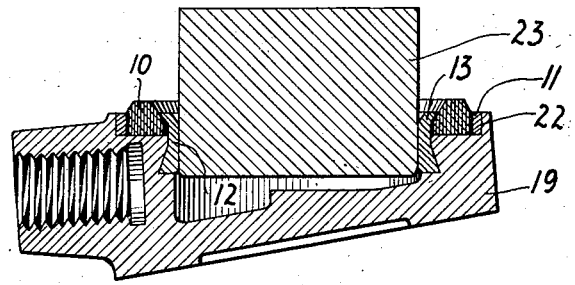
Figures 6 and 7 are similar to Figure 5 and show subsequent steps in the assembly of the structure.
Figure 7:
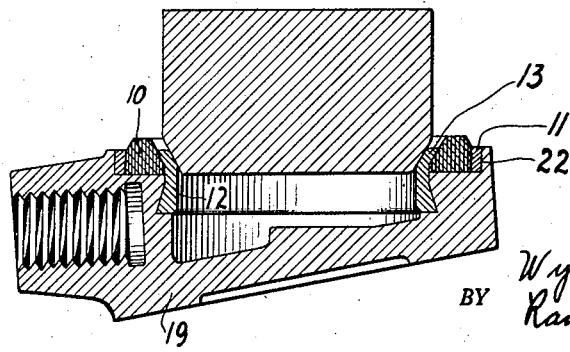

In the next step of assembly, which is illustrated in Figure 6, a punch 23 is pressed downwardly through the inner gripping ring 12 to deform the rib 14 outwardly, thereby expanding the lower end of the ring 12 into the undercut recess 21, permanently locking the inner gripping ring to the support body.

In the final operation, illustrated in Figure 6, a punch 24 having a tapered lower end is placed against the upper end of the inner gripping ring 12 and is forced downwardly to permanently distort this end of the inner gripping ring outwardly against the wear ring.

In this final condition, the somewhat resilient wear ring is now held in a highly compressed condition between the inner and outer gripping ring. The outer gripping ring exerts a constant contracting pressure against the outer periphery of the wear ring, while the inner gripping ring exerts a constant outward pressure on the inner periphery of the wear ring.

In an alternate construction the outer gripping ring 11 may be omitted. In this case the outer wall of wear ring 10 contacts directly with the conical bore 16 when the parts are in the position of Figure 3, and as the wear ring is pushed down the conical bore it is contracted. Upon being pushed from the cylindrical bore 17 into the recess 20 it expands and presses outwardly against the wall 22. The amount the wear ring is contracted is sufficiently greater than the limited expansion permitted when it expands against the ring 22 to cause it to permanently exert outward pressure against the ring 22 even after the ring 22 has yielded outwardly as explained heretofore.

In completing this form of the invention the inner gripping ring is then anchored in place and expanded, preferably in the manner above set forth in connection with the preferred form of the invention.

It should be noted that many essential points are common to the two forms of the invention disclosed. In both cases a wear ring of somewhat resilient material is first contracted, and it is then permitted to expand, the expansion being limited by a retaining or gripping ring. The amount of expansion permitted is less than the amount that would occur if the expansion were unconfined, and hence the wear ring is constantly pressing outwardly against the outer gripping ring.

In addition, the inner gripping ring is deformed outwardly so that it constantly presses against the wear member. Thus the wear member is held in a highly compressed condition between the inner and outer gripping rings.

In some cases it is practicable to omit the step of contracting the wear ring, and to merely assemble the parts and then deform the inner ring outwardly. However, there is danger that the wear ring will crack under these conditions, and by using the structure and method disclosed herein; namely, by first contracting the wear ring and causing it to press outwardly against the outer gripping ring, this danger of cracking the wear member is avoided.

While the wear ring of the finished assembly is suited for any use where great resistance to wear is essential, as in thrust bearings, it is particularly adapted for use as a sealing ring for valves, and it has been illustrated as associated with the head of a gate valve.

I claim:

1. The method of assembling a composite structure which comprises first assembling an outer gripping ring about a wear ring, contracting the gripping ring against the periphery of the wear ring so as to partly compress the wear ring, the outer gripping ring being then permitted to expand against the wall of a recess in a supporting body, the amount the outer gripping ring is permitted to expand being sufficiently less than the amount of its original contraction to cause the wear ring to permanently continue to press outwardly against the outer wear ring, then causing an inner gripping ring to press outwardly against the wear ring, thereby producing a structure in which the wear ring is held in a highly compressed condition between the inner and outer gripping rings.

2. The method of assembling a composite structure which comprises first assembling an outer gripping ring about a wear ring, contracting the gripping ring against the periphery of the wear ring so as to partly compress the wear ring, the outer gripping ring being then permitted to expand against the wall of a recess in a supporting body, the amount the outer gripping ring is permitted to expand being sufficiently less than the amount of its original contraction to cause the wear ring to permanently continue to press outwardly against the outer wear ring, then expanding an inner gripping ring outwardly against the wear ring, thereby producing a structure in which the wear ring is held in a highly compressed condition between the inner and outer gripping rings.

3. The method of assembling a composite structure which comprises first assembling an outer gripping ring about a wear ring, contracting the gripping ring against the periphery of the wear ring so as to partly compress the wear ring, the outer gripping ring being then permitted to expand against the wall of a recess in a supporting body, the amount the outer gripping ring is permitted to expand being sufficiently less than the amount of its original contraction to cause the wear ring to permanently continue to press outwardly against the outer wear ring, distorting part of an inner gripping ring into an undercut recess formed in the supporting body, and expanding part of the inner gripping ring outwardly against the wear ring, thereby producing a structure in which the wear ring is held in a highly compressed condition between the inner and outer gripping rings.

4. The method of assembling a composite structure which comprises first contracting a wear ring formed of somewhat resilient material, then permitting the wear ring to expand against the wall of a recess in a supporting body, the amount the wear ring is permitted to expand being sufficiently less than the amount of its original contraction to cause the wear ring to permanently continue to press outwardly against the wall of the recess, then causing an inner gripping ring to press outwardly against the wear ring, thereby producing a structure in which the wear ring is held in a highly compressed condition between the inner and outer gripping rings.

5. The method of assembling a composite structure which comprises first contracting the outer circumference of a wear ring of relatively frangible material, permitting the wear ring to expand slightly, the amount of expansion being limited by an outer gripping ring, holding the inner periphery of the wear ring distended by an inner gripping ring, thereby producing a structure in which the wear ring is held in a highly compressed condition between the inner and outer gripping rings.

WYLIE G. WILSON.